United States Patent
Kossat et al.

(10) Patent No.: US 6,561,019 B1
(45) Date of Patent: May 13, 2003

(54) METHOD AND APPARATUS FOR TENSILE TESTING A SPLICED CONNECTION OF FIBERS IN A FIBER SPLICING DEVICE

(75) Inventors: Rainer Kossat, Aschau (DE); Dirk Muessig, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/402,408

(22) PCT Filed: Mar. 23, 1998

(86) PCT No.: PCT/DE98/00847

§ 371 (c)(1),
(2), (4) Date: Oct. 4, 1999

(87) PCT Pub. No.: WO98/45676

PCT Pub. Date: Oct. 15, 1998

(30) Foreign Application Priority Data

Apr. 4, 1997 (DE) .......................................... 197 13 979

(51) Int. Cl.⁷ ................................................. G01L 5/04
(52) U.S. Cl. .............................. 73/160; 73/826; 73/831; 73/833; 73/834; 73/835
(58) Field of Search ................... 73/160, 768, 862.391, 73/862.39, 833–835, 826, 864.42, 158, 827, 831; 356/73.1; 385/134

(56) References Cited

U.S. PATENT DOCUMENTS

| | | | | |
|---|---|---|---|---|
| 5,178,007 A | * | 1/1993 | Ghorashi et al. .............. 73/160 |
| 5,187,767 A | * | 2/1993 | Hayes et al. ................ 385/160 |
| 5,233,200 A | | 8/1993 | DiMarcello et al. | |
| 5,680,206 A | * | 10/1997 | Loch ........................ 356/73.1 |
| 6,085,584 A | * | 7/2000 | Ramachandran et al. ..... 73/160 |

FOREIGN PATENT DOCUMENTS

| | | |
|---|---|---|
| DE | 38 38 890 | 5/1990 |
| EP | 0 549 131 | 6/1993 |
| EP | 0 574 062 | 12/1993 |
| WO | WO 96/33430 | 10/1996 |
| WO | WO 97/37203 | 10/1997 |

OTHER PUBLICATIONS

Riech et al, "Thermische LWL–Spleiss technik setzt sich durch", *Telecom Report*, vol. 18, No. 3, 1995, pp. 136–139.
Abstract of Japanese 02–282960 of Nov. 20, 1990, *Patent Abstracts of Japan*, vol. 015, No. 051 (P1163), Feb. 6, 1991.
Abstract of Japanese 09–096596 of Apr. 8, 1997, *Patent Abstracts of Japan*, vol. 97, No. 8, Aug. 29, 1997.
Abstract of Japanese 09–280998 of Oct. 31, 1997, *Patent Abstracts of Japan*, vol. 98, No. 2, Jan. 30, 1998.

* cited by examiner

*Primary Examiner*—Max Noori
*Assistant Examiner*—Jermaine Jenkins
(74) *Attorney, Agent, or Firm*—Harness Dickey & Pierce PLC.

(57) ABSTRACT

In a fiber splicing device, an adjustment apparatus for moving a first fiber-section perpendicular to its end face is designed such that it is composed of at least one piezo-actuator and a drive. After the splicing of the two fiber ends, the piezo-actuator is charged to a preset electrical voltage and the electrical voltage at the piezo-actuator is subsequently measured while the first carriage is moved away perpendicular to the fiber end face and is compared to the preset values. As a result thereof, the tensile stress acting on the fiber can be identified dependent on the movement of the first carriage, so that the drive can be arrested after a preset tensile testing stress has been reached.

8 Claims, 1 Drawing Sheet

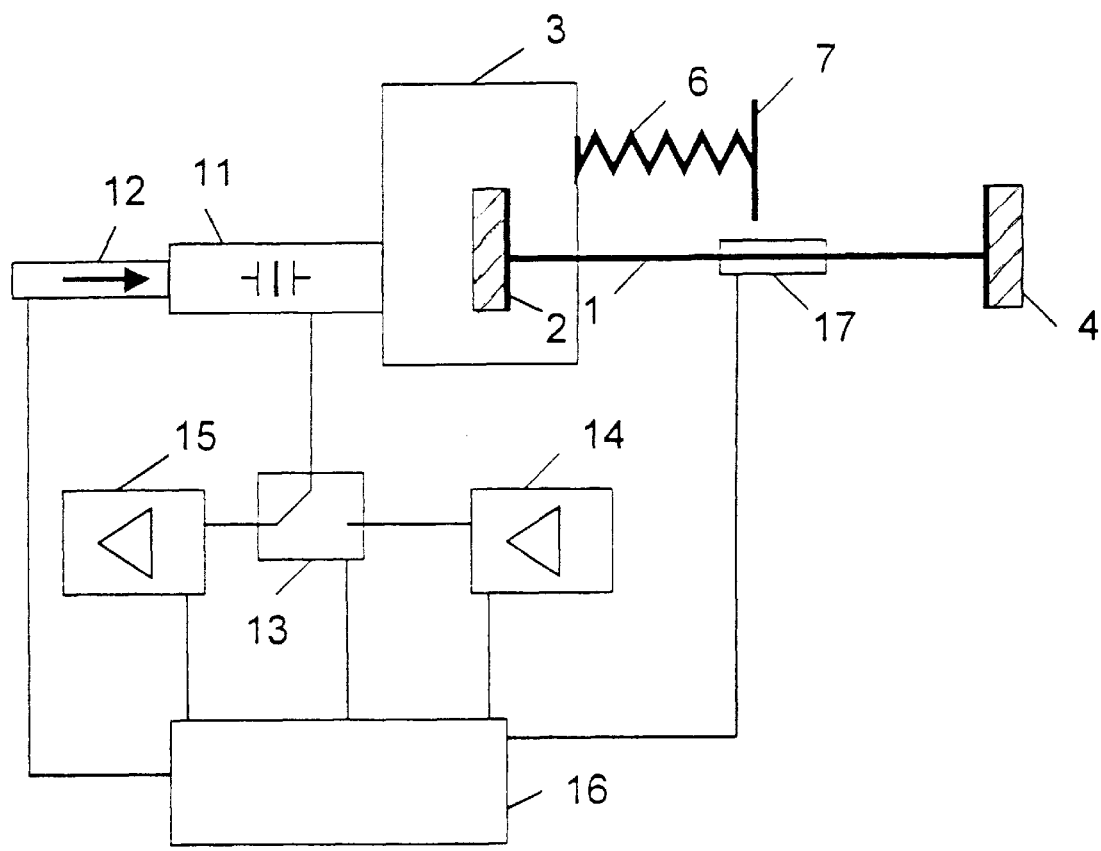

METHOD AND APPARATUS FOR TENSILE TESTING A SPLICED CONNECTION OF FIBERS IN A FIBER SPLICING DEVICE

The invention is directed to a method and to an apparatus for tensile testing of spliced fibers in fiber splicing devices which clamps the fibers on each side of the splice in fastening means.

Two methods are known for connecting the optical fibers being increasingly utilized in optical communications technology: first, gluing fiber end faces into pre-fabricated and standardized plugs and, second, splicing fibers with prepared fiber end faces to form a single fiber. When splicing the fibers in fiber splicing devices, two fibers with prepared end face are secured on two carriages that can then be moved with adjustment devices so that the fiber end faces can be aligned well relative to one another. After the adjustment, the two fiber ends are then generally thermally welded. For quality control of a splice, both the additional attenuation caused by the splice as well as the tensile stress withstood by the splice are checked.

The publication "Thermische LWL-Spleiβtechnik setzt such durch" (V. Riech, Telcom Report 18, (1995), No. 3, pages 136 through 139) discloses a splicing device wherein a finished splice can be tested for tensile strength while it is still in the device (page 138, third column, second paragraph). The splice is thereby loaded with an integrated restoring spring of a carriage having a fixed tensile testing stress dependent on the restoring force of the restoring spring. The tensile testing stress is permanently set when assembling the fiber splicing device and can no longer be subsequently modified, this being disadvantageous when splicing different fiber types (single-wave or multi-wave fibers, stepped index over gradient fibers) for different applications. Moreover, the tensile stress acting on the splice depends on the insertion of the fiber, is thus dependent on the user and is not suitable for checking for standardized tensile testing stresses.

SUMMARY OF THE INVENTION

The present invention is based on the object of developing a method for tensile testing in fiber splicing devices, whereby the user himself preselects the tensile testing stress dependent on the fiber type to be spliced, and whereby the tensile testing stress is independent of the insertion of the fiber.

The object is inventively achieved by a method comprising the steps of clamping a fiber on one side of the splice in a first fastening means on a carriage and clamping the other fiber in a second fastening means, moving the carriage by an adjustment means opposite to a spring, controlling the operation of the adjustment means, measuring the tensile stress applied to the splice as the carriage moves away from said second fastening means, and moving the carriage until the tensile stress reaches a predetermined value.

As a result of the inventive method, the user of a fiber splicing device is provided with the possibility of setting the tensile testing stress as he deems fit and potentially according to different standards for different fiber types, this being advantageous particularly when splicing different fiber types with the same fiber splicing device.

Further, the inventive method is distinguished by higher position compared to the method known from the prior art with the restoring spring. Over and above this, it is no longer necessary to manually set the restoring force of the spring when a fiber splicing device is placed into operation.

For example, strain gauges or piezo-actuators secured to the carriage can be utilized for measuring the tensile stress acting on the fiber splice. In a preferred embodiment, a piezo-actuator is co-employed for measurement that is already present in the fiber splicing device for adjusting the fiber sub-sections before splicing.

The invention is explained in greater detail with reference to an exemplary embodiment shown in the drawing.

BRIEF DESCRIPTION OF THE DRAWING

The FIGURE is schematic diagram of an apparatus for the implementation of the inventive method.

DESCRIPTION OF THE PREFERRED EMBODIMENT

For splicing a first fiber sub-section with prepared end face and a second fiber sub-section with prepared end face to form a single fiber 1, the FIGURE shows that the first fiber sub-section is clamped into a first fastening means 2 on a first carriage 3, and the second fiber sub-section is clamped into a second fastening device 4 on a second carriage (not shown). Adjustment devices (likewise not shown) at the first and at the second carriage see to it that the carriages are displaceable in two directions perpendicular to one another and parallel to the end faces of the two fibers so that the two fiber end faces can be adjusted relative to one another so that an optimally small offset arises perpendicular to the two fiber axes. Checking systems (likewise not shown) serve the purpose of monitoring a good adjustment in which both fiber end faces can either be viewed together with a microscope or light can be coupled into the first fiber sub-section, and the light power coupled from the first into the second fiber sub-section via the two end faces is detected. The first carriage 3 is connected via a restoring spring 6 perpendicular to the end face of the first fiber sub-section to a further fastening device 7 on the fiber splicing device. A further adjustment means composed of a piezo-actuator 11 and of a further drive 12 displaces the first carriage 3 perpendicular to the end face of the first fiber sub-section. The first fiber sub-section and the second fiber sub-section can be moved toward and away from one another with the assistance of this further adjustment means. The piezo-actuator 11 is thereby connected via a switch over means 13 either to the piezo-output stage 14 or to a test amplifier 15, for example a high-impedance electrometer amplifier. A control means 16 is connected both to the further drive 12 as well as to the test amplifier 15, the switch over means 13 and the piezo-output stage 14 and is also connected to the splicing device 17 for splicing the two fiber sub-sections. After the splicing process, the piezo-actuator 11 is charged via the piezo-stage 14 to an electrical voltage value preset by the control means 16. Subsequently, the switch over means 13 is switched in a controlled fashion by the control means 16, so that the piezo-actuator 11 is connected to the test amplifier 15 that measures the electrical voltages adjacent at the piezo-actuator 11 and communicates them to the control means 16. This electrical voltage then continues to be measured while, under the control of the control means 16, the further drive 12 is operated so that the first carriage 3 moves away from the second carriage. Due to the departure of the first carriage 3, both the fiber 1 as well as the piezo-actuator 11 are subjected to a tensile stress by the restoring spring 6. What the known piezo-effect thereby causes is that the tensile stress is converted at the piezo-actuator 11 into a modified, adjacent electrical voltage. The comparison of the measured electrical voltage to preset values yields the tensile stress adjacent at the fiber 1, as a result whereof the further drive 12 can be moved back until the preset tensile testing stress for the fiber splice has been reached.

We claim:

1. A method for tensile testing of a fiber splice between a pair of fibers in a fiber splicing device comprising the steps of:

clamping one of the fibers of the splice in a first fastening device on a carriage and clamping the other fiber of the pair in a second fastening device, moving the carriage in a direction opposite to a restoring spring, which acts on the carriage and which is secured to a fiber splicing device, by an adjustment means for moving the carriage, and controlling an operation of the adjustment means by means for controlling so that a tensile stress acting on the fiber splice is measured by a measuring device connected to the means for controlling while the carriage is moved away from the second fastening device by the adjustment means until the tensile stress measured by the measuring device corresponds to a tensile testing stress predetermined by the means for controlling.

2. A method according to claim 1, wherein the step of moving the carriage includes providing a drive and a piezoelectric actuator connected to the means for controlling by a piezo-output stage, said piezoelectric actuator serving as the measuring device, measuring an electrical voltage adjacent the piezoelectric actuator while the carriage is being moved away, said carriage being moved back until the electrical voltage adjacent the piezoelectric actuator corresponds to a tensile testing stress predetermined by the means for controlling.

3. An apparatus for tensile testing of a fiber splice between ends of a pair of fibers in a fiber splicing device, said apparatus comprising:

first means for clamping one fiber of the pair of fibers, second means for clamping a second fiber of the pair of fibers, a movable carriage supporting the first means, adjustment means for moving the carriage in a direction extending parallel to the axes of the pair of fibers against a restoring spring, which acts on the carriage and which is secured to the fiber splicing device, control means for controlling an operation of the adjustment means, a test amplifier connected to the control means, a piezo-output stage connected to the control means, said adjustment means containing a drive and a piezo-actuator, and means for switching ever a coupling of the piezo-actuator from the piezo-output stage to the test amplifier, so that an electrical voltage measurement can be made to determine a tensile stress.

4. A method for tensile testing of a fiber splice between a pair of fibers in a fiber splicing device comprising the steps of:

clamping one of the fibers of the splice in a first fastening device on a carriage and clamping the other fiber of the pair in a second fastening device;

moving the carriage in a direction opposite to a restoring spring, which acts on the carriage and which is secured to a fiber splicing device, by an adjustment device for moving the carriage, and measuring a tensile stress acting on the fiber splice while the carriage is moved away from the second fastening device; and controlling the adjustment device to move the carriage until the measured tensile stress corresponds to a tensile testing stress.

5. The method of claim 4, wherein the adjustment device includes a piezoelectric actuator and an electrical voltage adjacent to the piezoelectric actuator is measured while the carriage is being moved back until the electrical voltage adjacent the piezoelectric actuator corresponds to the tensile testing stress.

6. An apparatus for tensile testing of a fiber splice between ends of a pair of fibers in a fiber splicing device, said apparatus comprising:

first clamp for clamping one fiber of the pair of fibers;

second clamp for clamping a second fiber of the pair of fibers;

a movable carriage supporting the first clamp;

adjustment device for moving the carriage in a direction extending parallel to the axes of the pair of fibers against a restoring spring, which acts on the carriage and which is secured to the fiber splicing device;

a controller for controlling an operation of the adjustment device; and a measurement device for making an electrical voltage measurement to determine a tensile stress acting on the fiber splice.

7. The apparatus of claim 6, wherein the adjustment device includes an actuator and a drive.

8. The apparatus of claim 6, wherein the measurement device includes a test amplifier, and wherein the controller controls the adjustment device to move the carriage until the determined tensile stress corresponds to a tensile testing stress.

* * * * *